United States Patent [19]

Weitekamp

[11] Patent Number: 5,022,133
[45] Date of Patent: Jun. 11, 1991

[54] WHEEL MOUNTING TOOL

[76] Inventor: James B. Weitekamp, R.R. 1, Box 62, Harvel, Ill. 62538

[21] Appl. No.: 575,599

[22] Filed: Aug. 31, 1990

[51] Int. Cl.⁵ ............................................. B25B 27/14
[52] U.S. Cl. ...................................................... 29/273
[58] Field of Search ............... 29/273; 81/177 B, 15.2; 7/100, 138, 166; 157/1.1, 1.11; 254/120, 131

[56] References Cited

U.S. PATENT DOCUMENTS

| | | | |
|---|---|---|---|
| 1,494,269 | 5/1924 | Meyers | 29/273 |
| 1,649,130 | 11/1927 | Schoenwerk | 29/273 |
| 1,735,124 | 11/1929 | Miller | 29/273 |
| 1,969,233 | 8/1934 | Patterson | 29/273 |
| 1,975,773 | 10/1934 | Davis | 29/273 |
| 1,999,206 | 4/1935 | Patterson | 29/273 |
| 2,499,758 | 3/1950 | Kayfetz | 29/273 |
| 3,048,919 | 8/1962 | Bald | 29/273 |
| 3,319,327 | 5/1967 | Dombeck | 29/273 |
| 3,348,294 | 10/1967 | Gerardi | 29/273 |
| 3,364,558 | 1/1968 | Freet | 29/273 |
| 3,389,453 | 6/1968 | Tarter et al. | 29/273 |
| 4,097,979 | 7/1978 | Interdonato | 29/273 |
| 4,602,415 | 7/1986 | Garcia | 29/273 |

FOREIGN PATENT DOCUMENTS 161353 2/1955 Australia ................... 29/273

Primary Examiner—Robert C. Watson
Attorney, Agent, or Firm—McCaleb, Lucas & Brugman

[57] ABSTRACT

A wheel mounting tool for a wheel assembly including a hub with a plurality of bolt studs and a wheel with bolt holes registerable with the bolt studs comprises an elongated, rigid straight shank with a cylindrical open-ended socket on at least one end. The socket has an inside cylindrical surface with a diameter larger than the diameter of the bolt studs and an outside cylindrical surface with a diameter smaller than the diameter of the bolt holes. In a preferred embodiment, a shallow internal thread extends circumferentially around the inside cylindrical surface adjacent the open mouth end of the socket. The inside diameter of the internal threads is larger than the outside diameter of the bolt studs enabling the socket to be assembled onto and removed from the bolt studs by relative axial movement. Alternatively, the internal threads may be substituted by a helical array of thread segments or internal protuberances having a pitch angle matching the pitch angle of the threads on the bolt studs. A further alternative is to provide an inner sleeve of indentable material inside the socket to resist relative axial movement between the socket and bolt stud during mounting of the wheel.

7 Claims, 3 Drawing Sheets

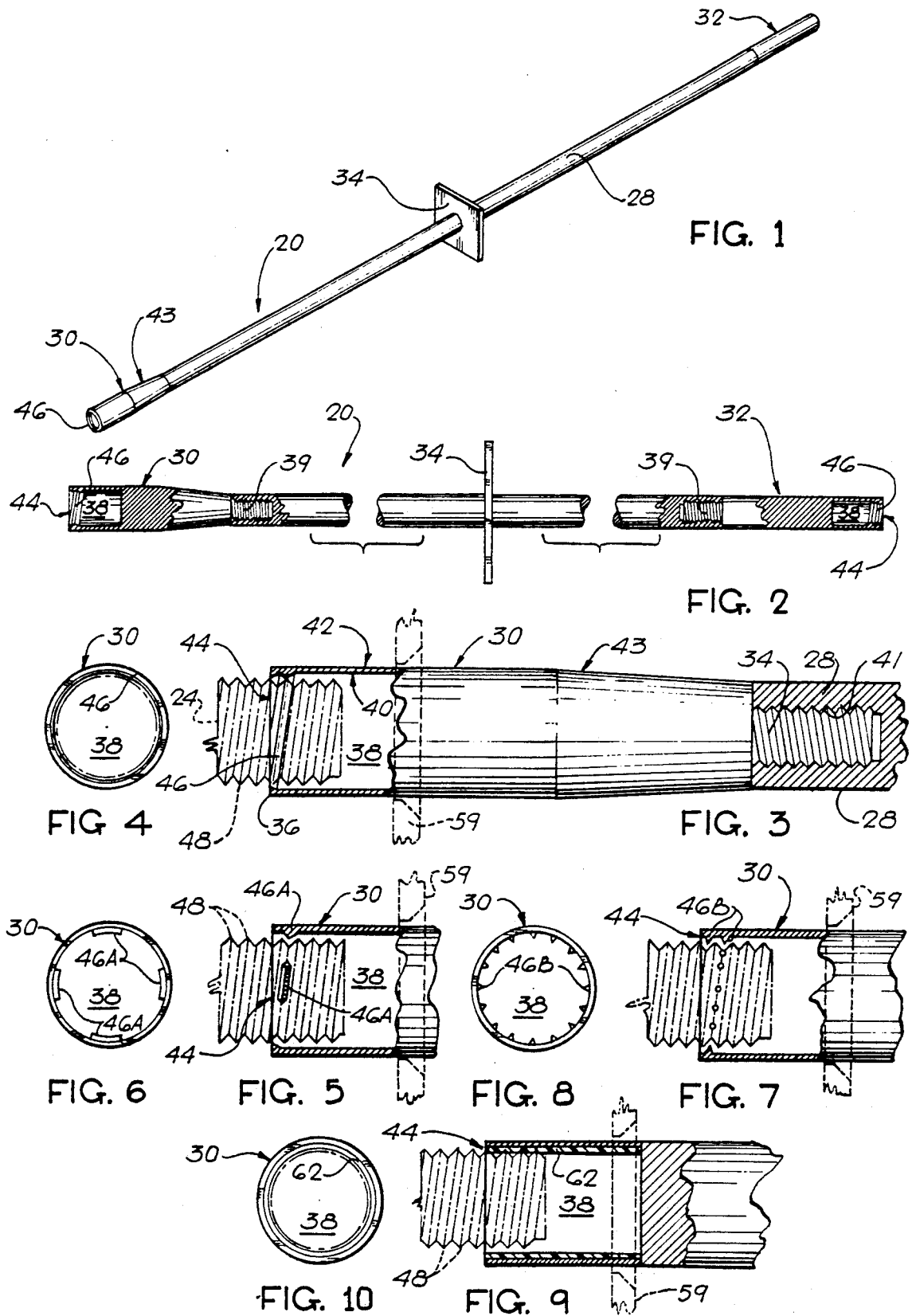

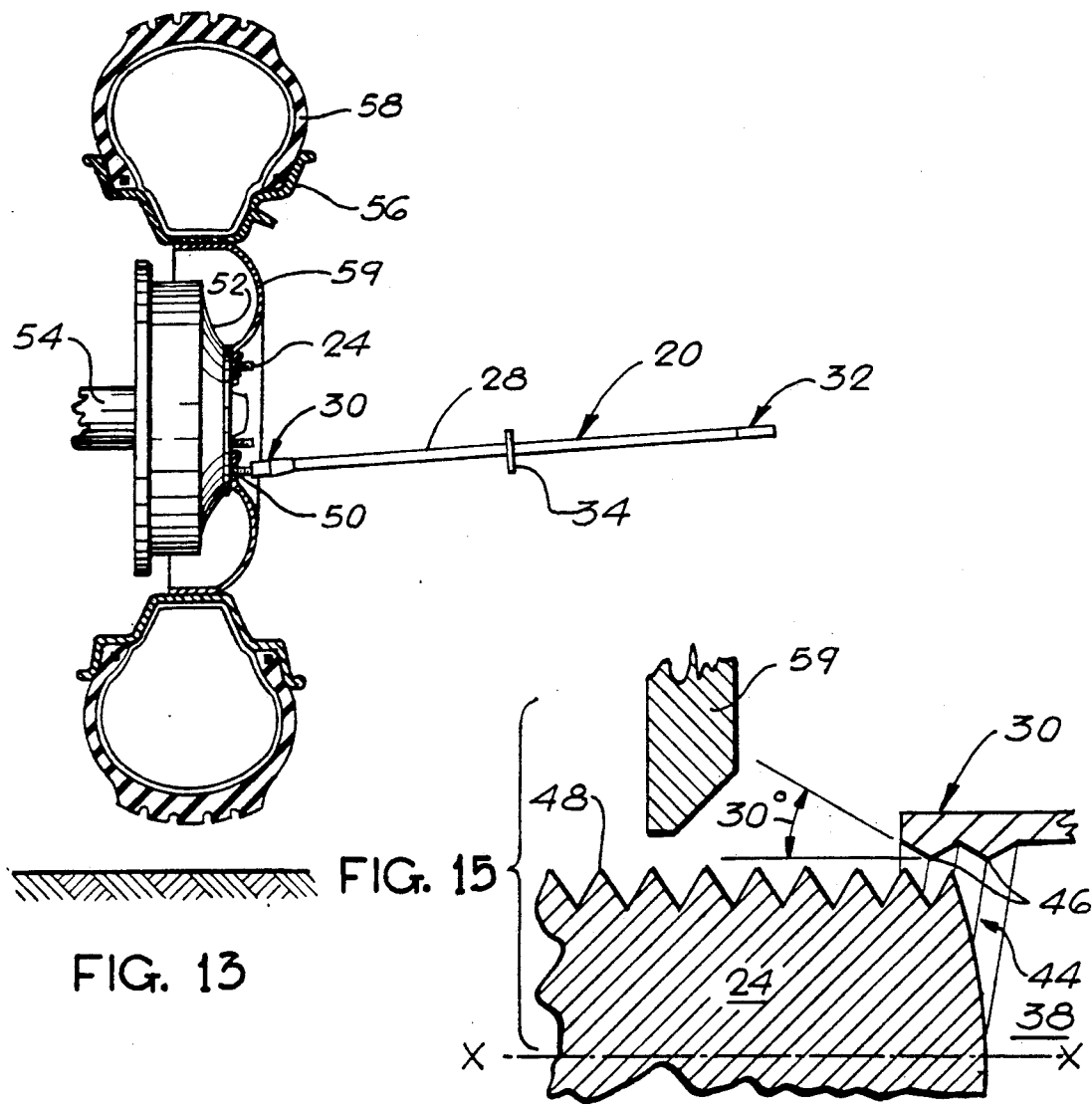
FIG. 13
FIG. 15
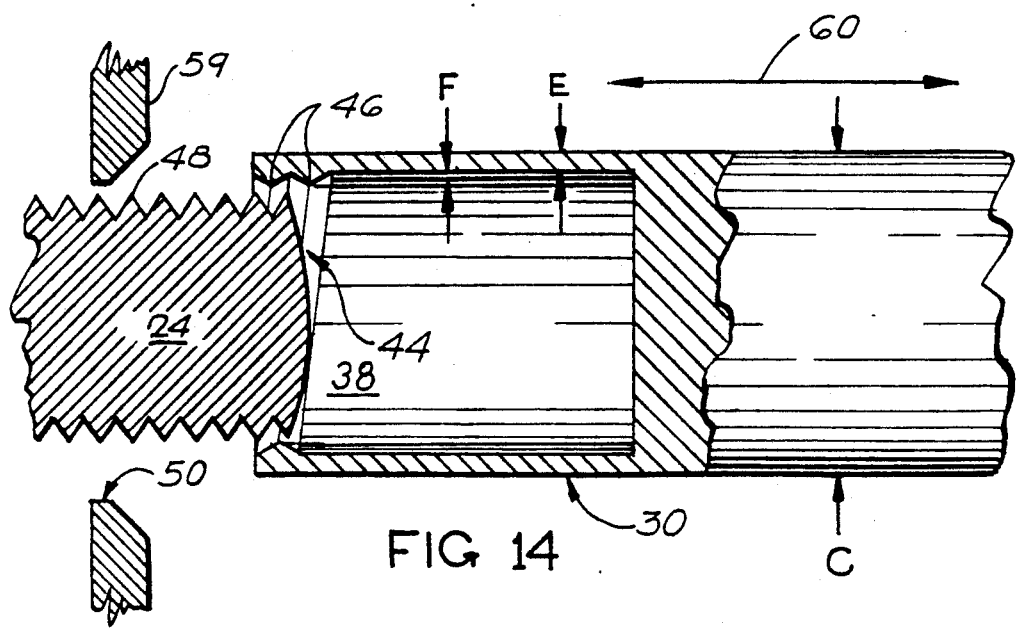
FIG 14

WHEEL MOUNTING TOOL

BACKGROUND OF THE INVENTION

It is sometimes necessary to remove an automobile or truck wheel and mount a spare wheel in its place. These are heavy, awkward to lift, and dirty. A person changing a tire is likely to soil his or her hands and clothing.

In changing a tire, removal of the wheel is effected simply by jacking up the respective axle so the tire will clear the ground, removing the wheel nuts, and dropping the wheel to the ground. But, replacing the wheel requires lifting it up to the axle level with the operator's arms extending inside the wheel well, while turning it in mid-air to register the wheel holes with the bolt studs.

Tools have been proposed to simplify this lifting and turning operation, but none has been entirely satisfactory.

A common feature of many of these prior art tools is that they have a stud-receiving socket on the end of a rod or shank which functions as a pilot bar. To mount or remount a wheel, the rod or shank is inserted through a bolt hole in the wheel, with the socket engaging the corresponding bolt stud on the hub. By lifting the other end of the rod, leverlike, the wheel can be elevated and guided onto the bolt studs on the hub.

In some of these prior art tools, the end of the socket is undercut on the bottom so that only a relatively small arcuate upper lip can engage the bolt stud to lever the wheel upwardly into place. Examples of such undercut constructions are shown in Schoenwerk U.S. Pat. No. 1,649,130 issued in 1927 on Tool For Mounting Disc Wheels, Patterson U.S. Pat. No. 1,999,206 issued in 1935 on Wheel Mounting Tool, and Freet U.S. Pat. No. 3,364,558 issued in 1968 on Wheel-Mounting Tool. A serious disadvantage of this undercut construction is that the rotational orientation of the tool is critical. It must be turned so the arcuate upper lip on the socket hooks over the top of the bolt stud, otherwise it slips off, possibly dropping the wheel on the operator. It is difficult to keep the tool precisely upright because the wheel covers the hub and obscures the operator's view of the socket.

In some other prior art tools, there is a universal or bolt joint between the tool shank and the socket. Examples are shown in Meyers U.S. Pat. No. 1,494,269 issued in 1924 on Tool For Mounting Disc Wheels, and Tarter et al. U.S. Pat. No. 3,389,453 issued in 1968 on Tire Installation Tool. A major disadvantage of this universal joint construction is that it is unstable and likely to slip off the bolt stud during the wheel lifting operation.

One proposal for such a tool is shown in Patterson U.S. Pat. No. 1,969,233 issued in 1934 on Wheel Mounting Tool. FIG. 4 of that patent shows a continuous circumferential inwardly extending retaining flange at the mouth of the socket. This is intended to engage the bolt stud thread to keep the tool from slipping off during the wheel lifting operation. Because the flange is at right angles to the axis of the socket, it will tend to ride on the tips of the bolt stud threads if the pilot rod and bolt stud are coaxially aligned. To get some effective engagement of the socket flange in the space between the bolt stud threads, the tool handle must be cocked out of alignment with the bolt stud. Further, the flange is made very thin resembling a knife edge to help it fit between the threads. This is a disadvantage because this sharp edge interferes with smooth withdrawal of the socket after the wheel is lifted into place.

There is a need for such a wheel mounting tool which will positively engage the space between threads in a bolt stud during the wheel mounting operation without peculiarly orienting the tool shank, and which is easily released from the bolt stud threads after the wheel is lifted into place.

SUMMARY OF THE INVENTION

A general object of this invention is to provide a wheel mounting tool which will positively engage a bolt stud to elevate a wheel from ground level to a position where the wheel holes are registered and engaged with the bolt studs, and which tool will be easily released from both the bolt stud and the wheel.

Another object is to provide such a wheel mounting tool which is light in weight, compact to store, easy to use by non-mechanically-inclined persons, and inexpensive.

Another object is to provide the tool with a socket having connecting means positively and temporarily connectable with the bolt stud threads and extending completely circumferentially and uninterruptedly around an inside cylindrical surface of a socket, such connecting means having an inside diameter larger than the outside diameter of the bolt stud enabling the socket to be assembled onto and removed from the bolt studs by relative axial movement.

Another object is to provide such connecting means in a form which is engageable into the space between the bolt stud threads at the pitch angle of those threads when the socket and corresponding bolt stud are coaxially aligned to thereby maintain an effective connection between the socket and threads during mounting of the wheel.

In essence, the present invention consists of a straight, rigid shank with a socket having a continuous, uninterrupted cylindrical inside surface and connecting means engageable with one of the bolt studs. The connecting means illustrated takes two forms: (1) a thread or thread segments or inner protuberances having the same pitch angle as the bolt stud threads; or (2) an interior sleeve of indentable material. Further, the inside diameter of the connecting means is larger than that of the bolt stud, and the inside diameter of the socket and shank are both less than the wheel bolt holes enabling the tool to be assembled onto and removed from the bolt studs by relatively axial movement.

BRIEF DESCRIPTION OF THE DRAWING

Other objects of the invention will be apparent from the following description in connection with the drawings in which:

FIG. 1 is a perspective view of the present invention;

FIG. 2 is an enlarged, fragmentary plan view of FIG. 1;

FIG. 3 is an enlarged partially cut away view of one of the sockets shown in FIG. 2;

FIG. 4 is an open end view of FIG. 3;

FIG. 5 is another embodiment of a socket in a view similar to FIG. 3;

FIG. 6 is an end view of FIG. 5;

FIG. 7 is another embodiment of a socket in a view similar to FIGS. 3 and 5;

FIG. 8 is an end view of FIG. 7;

FIG. 9 is another embodiment of a socket similar to FIGS. 3, 5 and 7;

FIG. 10 is an end view of FIG. 9;

FIG. 13 is a view of a wheel assembly similar to FIG. 11, partly in section, showing a final stage in using the tool to mount a wheel;

FIG. 14 is a fragmentary enlarged view of FIG. 13; and

FIG. 15 is a fragmentary enlarged view of FIG. 14.

Like parts are designated by like reference characters throughout the drawings.

DETAILED DESCRIPTION OF THE PREFERRED EMBODIMENTS

Figure 11:
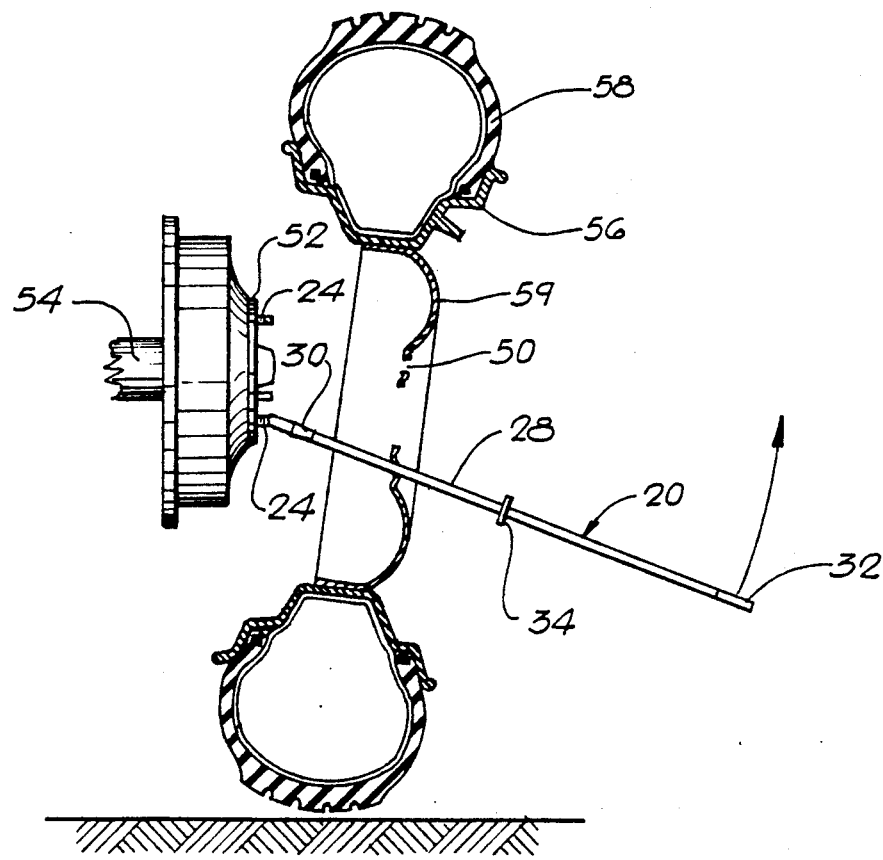
FIG. 11 is a view of a wheel assembly partly in section showing an initial stage in using the tool to mount a wheel.

Referring first to the preferred embodiment shown in FIGS. 1-4 and 11-15, the wheel mounting tool is generally designated 20. It is used for mounting a wheel 56 with tire 58 on bolt studs 24 carried by a hub 52 in the wheel assembly shown in FIGS. 11 and 13.

The wheel mounting tool 20 comprises an elongated rigid straight rod or shank 28 with cylindrical open-ended sockets 30 and 32 at opposite ends and a square collar 34 secured as by welding intermediate the sockets. The flats on the edge of the collar prevent the tool from rolling on a non-level surface.

Sockets 30 and 32 may be provided for two common automobile or truck bolt sizes. For example, socket 30 may be used for American automobiles and trucks where the bolt stud diameters B are ½" and the bolt hole diameters D in the flange 59 are ⅝" as shown in FIG. 14. Socket 32 may be sized somewhat smaller for use with foreign automobiles having 12 mm diameter bolt studs with 15 mm diameter bolt holes. Alternatively, large cross-country 18-wheelers will require larger sockets. The sockets may be removable and replaceable as shown or they may be permanent. Only one socket may be used.

Referring now to removable socket 30 shown in FIGS. 3, 4 and 12-14, it comprises a continuous cylindrical open-ended body 36 having a recess 38 with an inside cylindrical surface 40 and an outside cylindrical surface 42. It has a rearward axial threaded extension 39 engaged with a threaded opening 41 in the adjacent end of shank 28. The socket has a rear, conically tapered outside surface 43 providing a smooth transition between the shank and the larger socket. Socket 32 may be slightly smaller than socket 30, so may not require such a tapered transition.

As best shown in FIGS. 14 and 15, connecting means 44 is provided on the inside cylindrical surface 40, near the open mouth of the recess 38 to positively hold the end of the socket 30 onto the bolt studs 24. In the embodiment shown in FIGS. 3, 14 and 15, the connecting means 44 comprises a thread 46 extending continuously around the mouth of recess 38. This thread has a pitch angle equivalent to that of thread 48 on the bolt studs 24 in order to interlock and hold the socket positively against slippage during the lifting operation shown in FIGS. 11 and 12. Further, the thread 46 is shallow, preferably with a tooth surface angle of less than 45° relative to the central axis X—X, and more preferably about 30° as shown in FIG. 15. This shallow tooth angle enables the socket thread 46 to be readily disengaged, without lock up, by a straight axial pull exerted on the socket in the direction of arrow 60 (FIG. 14).

While FIG. 3 shows the shallow thread 46 around the mouth of the recess 38, the thread 46 may be formed all along the inside cylindrical surface 40 if manufacturing efficiency requires this.

Referring now to FIG. 14, an important part of the present invention was the discovery that the inside diameter of the threads 46 (or other connecting means 44) inside the socket can be made larger than the outside diameter B of the bolt studs, and the outside diameter C of the socket can be made smaller than the diameter D of the wheel holes 50, and still leave enough wall thickness E to provide adequate strength for functioning on a wide variety of modern day cars and trucks with large, heavy wheels.

For example, for wheels using the popular ½" bolt studs as shown in FIG. 14, where the inside diameter A of the connecting threads is 0.510", the outside diameter C is 0.615", and the radial height F of thread 46 is 0.0156" (1/64"), the wall thickness E of the socket would be 0.0364". In rigorous tests on actual tool prototypes where the thickness E was only 0.003" (1/32"), the tool had sufficient strength to function perfectly on heavy wheel assemblies of automobiles and trucks having these standard ½" bolt studs.

Figure 12:
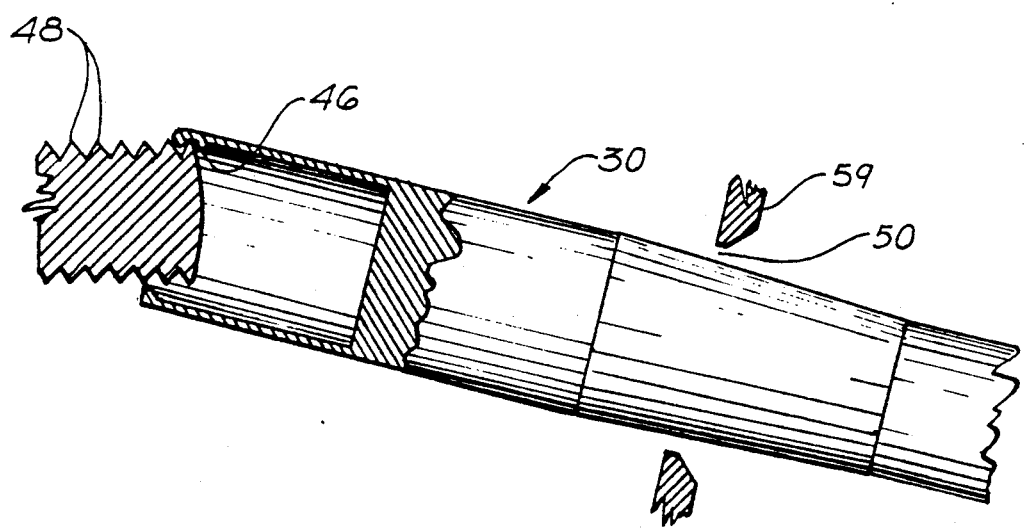
FIG. 12 is a fragmentary, enlarged view of FIG. 11.

It is believed that use and operation will be readily apparent from the above. Briefly, however, assume a hub 52 with bolt studs 24 on axle 54 is elevated by a jack (not shown), as illustrated in FIG. 11. The wheel 56 with a tire 58 and inner rim or flange 59 having bolt holes 50 is to be mounted. This is carried out by first inserting the appropriate socket 30 and shank 28 through one of the wheel bolt holes 50 and engaging the socket thread 46 in the space between bolt stud threads 48 as shown in FIGS. 11 and 12. Then, by a simple upward leverlike motion of the second class with one hand, while the other hand guides the wheel for rotational alignment, the operator lifts the wheel and slides it toward the hub with the wheel holes 50 registered with and engaging the bolt studs 24 as shown in FIG. 13. The tool is removed by drawing it outwardly in the direction of arrow 60 in FIG. 14.

During manipulation of the heavy wheel and tire, for safety, the collar 34 prevents the wheel from slipping outwardly toward the operator and possibly pinching his hand against the shank.

As shown in the alternative form in FIGS. 5 and 6, a plurality of internal thread segments 46A may be substituted for the internal thread 46 shown in FIGS. 3 and 4. These thread segments will preferably but not necessarily be disposed along a helical path corresponding to the pitch angle of the threads 48 on the bolt studs 24 so the segments fit precisely in the spaces between adjacent threads.

As shown in the further alternative form in FIGS. 7 and 8, a plurality of inwardly extending pointed projections or protuberances 46B may be substituted for the internal thread 46 shown in FIGS. 3 and 4. These, too, will preferably but not necessarily be disposed along a helical path corresponding to the pitch angle of the threads 48.

FIGS. 9 and 10 show a still further alternative for connecting means exemplified by the thread 46, thread segments 46A, and protuberances 46B. A sleeve 62 of tough, indentable material may be disposed in the socket 30. The indentable sleeve 62 may be a plastic material such as nylon or epoxy or a soft metal such as lead, copper or aluminum. The common characteristics of elements 46, 46A, 46B and 62 are that they each have an inside diameter larger than the bolt studs 24 enabling the socket to be assembled and removed from the bolt studs by relative axial movement in the direction of arrow 60 in FIG. 14; and the thread 46, thread segments 46A, protuberances 46B and sleeve 62 are insertable into the space between adjacent bolt stud threads 48, at the pitch angle thereof when the socket 30 and one of the bolt studs 24 are coaxially aligned as shown in FIG. 14. This temporarily maintains an effective, positive connection between the socket and bolt stud threads during mounting of the wheel without interfering with removal of the tool after the wheel is mounted.

The embodiments described and shown to illustrate the present invention have been necessarily specific for purposes of illustration. Alterations, extensions and modifications would be apparent to those skilled in the art. The aim of the appended claims, therefore, is to cover all variations included within the spirit and scope of the invention.

The embodiments of the invention in which an exclusive property or privilege is claimed are defined as follows:

1. A wheel mounting tool for a wheel assembly including a hub with a plurality of bolt studs having threads of a first diameter and a wheel with a plurality of bolt holes of a second diameter larger than said first diameter registerable with the bolt studs to receive the bolt studs therethrough, said tool comprising:
   an elongated straight shank;
   a cylindrical open-ended socket on at least one end of the shank having an inside cylindrical surface with a diameter larger than said first diameter and an outside cylindrical surface with a diameter smaller than said second diameter;
   connecting means comprising a plurality of internal thread segments extending circumferentially around the inside cylindrical surface of the socket oriented at the pitch angle of the threads on the bolt studs and having an inside diameter larger than said first diameter enabling the socket to be telescopically assembled onto and removed from the bolt studs by relative axial movement; and
   said connecting means being engageable into the space between the bolt stud threads at the pitch angle thereof when the socket and a corresponding bolt stud are coaxially aligned to thereby maintain an effective connection between the socket and threads during mounting of the wheel.

2. A wheel mounting tool for a wheel assembly including a hub with a plurality of bolt studs having threads of a first diameter and a wheel with a plurality of bolt holes of a second diameter larger than said first diameter registerable with the bolt studs to receive the bolt studs therethrough, said tool comprising:
   an elongated straight shank;
   a cylindrical open-ended socket on at least one end of the shank having an inside cylindrical surface with a diameter larger than said first diameter and an outside cylindrical surface with a diameter smaller than said second diameter;
   connecting means comprising a plurality of inwardly extending protuberances extending circumferentially around the inside cylindrical surface of the socket engageable with the threads on the bolt studs and having an inside diameter larger than said first diameter enabling the socket to be telescopically assembled onto and removed from the bolt studs by relative axial movement; and
   said connecting means being engageable into the space between the bolt stud threads at the pitch angle thereof when the socket and a corresponding bolt stud are coaxially aligned to thereby maintain an effective connection between the socket and threads during mounting of the wheel.

3. A wheel mounting tool for a wheel assembly including a hub with a plurality of bolt studs having threads of a first diameter and a wheel with a plurality of bolt holes of a second diameter larger than said first diameter registerable with the bolt studs to receive the bolt studs therethrough, said tool comprising:
   an elongated straight shank;
   collar means at an intermediate position on the shank to prevent a wheel from slipping toward one and used as a handle, said collar means having at least one external flat surface to prevent the tool from rolling on an inclined surface;
   a cylindrical open-ended socket on at least one end of the shank having an inside cylindrical surface with a diameter larger than said first diameter and an outside cylindrical surface with a diameter smaller than said second diameter;
   connecting means extending circumferentially around the inside cylindrical surface of the socket and having an inside diameter larger than said first diameter enabling the socket to be telescopically assembled onto and removed from the bolt studs by relative axial movement; and
   said connecting means being engageable into the space between the bolt stud threads at the pitch angle thereof when the socket and a corresponding bolt stud are coaxially aligned to thereby maintain an effective connection between the socket and threads during mounting of the wheel.

4. A wheel mounting tool for a wheel assembly including a hub with a plurality of bolt studs having threads of a first diameter and a wheel with a plurality of bolt holes of a second diameter larger than said first diameter registerable with the bolt studs to receive the bolt studs therethrough, said tool comprising:
   an elongated straight shank;
   a cylindrical open-ended socket on at least one end of the shank having an inside cylindrical surface with a diameter larger than said first diameter and an outside cylindrical surface with a diameter smaller than said second diameter;
   connecting means comprising an inner sleeve of indentable material inside said socket capable of being indented by said bolt stud threads sufficiently to resist relative axial movement of the socket and bolt stud during lifting of the wheel, said sleeve extending circumferentially around the inside cylindrical surface of the socket and having an inside diameter larger than said first diameter enabling the socket to be telescopically assembled onto and removed from the bolt studs by relative axial movement; and
   said connecting means being engageable into the space between the bolt stud threads at the pitch angle thereof when the socket and a corresponding bolt stud are coaxially aligned to thereby maintain an effective connection between the socket and threads during mounting of the wheel.

5. A wheel mounting tool for a wheel assembly including a hub with a plurality of bolt studs having threads of a first diameter and a wheel with a plurality of bolt holes of a second diameter larger than said first diameter registerable with the bolt studs to receive the bolt studs therethrough, said tool comprising:
- an elongated straight shank;
- a cylindrical open-ended socket on at least one end of the shank having an inside cylindrical surface with a diameter larger than said first diameter and an outside cylindrical surface with a diameter smaller than said second diameter;
- thread means comprising a plurality of thread segments oriented at a pitch angle corresponding to the pitch angle of the threads on the bolt studs, said thread segments extending circumferentially around the inside cylindrical surface of the socket and having an inside diameter larger than said first diameter enabling the socket to be telescopically assembled onto and removed from the bolt studs by relative axial movement;
- said thread means being engageable with threads on a corresponding bolt stud in response to transverse movement of the socket toward the bolt stud to thereby maintain an effective, releasable connection between the socket and bolt stud threads during mounting of the wheel; and
- said thread means being disengaged from threads on the bolt stud when the socket and bolt stud are coaxially aligned thereby enabling the socket to be assembled onto and removed from the bolt stud by relative axial movement.

6. A wheel mounting tool for a wheel assembly including a hub with a plurality of bolt studs having threads of a first diameter and a wheel with a rim having a plurality of bolt holes of a second diameter larger than said first diameter and being registerable with the bolt studs, said tool comprising:
- an elongated straight shank;
- an open-ended socket on both ends of the shank each having an inside cylindrical surface with a diameter larger than said first diameter of a corresponding bolt stud and an outside cylindrical surface with a diameter smaller than said second diameter of a corresponding bolt hole;
- a collar intermediate the socket, to keep the wheel from slipping toward either end used as a handle, said collar being of non-round configuration to prevent rolling on a non-level surface;
- connecting means extending circumferentially around the inside cylindrical surface of each socket and having an inside diameter larger than the corresponding first diameter enabling the socket to be telescopically assembled onto and removed from the bolt studs by relative axial movement; and
- each said connecting means being effective in response to transverse movement of the socket relative to a bolt stud when telescopically assembled and coaxially aligned therewith, to interlockably engage the threads on the bolt stud.

7. A wheel mounting tool for a wheel assembly including a hub with a plurality of bolt studs having threads of a first diameter and a wheel with a plurality of bolt holes of a second diameter larger than said first diameter registerable with the bolt studs to receive the bolt studs therethrough, said tool comprising:
- an elongated straight shank;
- a cylindrical open-ended socket on at least one end of the shank having an inside cylindrical surface with a diameter larger than said first diameter and an outside cylindrical surface with a diameter smaller than said second diameter;
- thread means comprising at least one internal thread oriented at a pitch angle corresponding to the pitch angle of the threads on the bolt studs, said thread extending circumferentially around the inside cylindrical surface of the socket and having an inside diameter larger than said first diameter enabling the socket to be telescopically assembled onto and removed from the bolt studs by relative axial movement;
- said thread means being engageable with threads on a corresponding bolt stud in response to transverse movement of the socket toward the bolt stud to thereby maintain an effective, releasable connection between the socket and bolt stud threads during mounting of the wheel; and
- said thread means being disengaged from said threads on the bolt stud when the socket and bolt stud are coaxially aligned thereby enabling the socket to be assembled onto and removed from the bolt stud by relative axial movement.

* * * * *